UNITED STATES PATENT OFFICE.

WILHELM RATH, OF BOTTMINGEN, SWITZERLAND.

PROCESS OF PRODUCING NON-ALCOHOLIC MALT LIQUOR.

SPECIFICATION forming part of Letters Patent No. 680,076, dated August 6, 1901.

Application filed January 2, 1901. Serial No. 41,901. (No specimens.)

*To all whom it may concern:*

Be it known that I, WILHELM RATH, a citizen of the German Empire, residing in Bottmingen, Switzerland, have invented certain new and useful Improvements in a Process of Producing a Non-Alcoholic Malt Liquor; and I do hereby declare the following to be a full, clear, and exact description of the invention, such as will enable others skilled in the art to which it appertains to make and use the same.

This invention relates to an improved process for the manufacture of beer-wort which shall remain free from alcohol—that is, a wort prepared in such a manner that it will not ferment, and therefore constitutes a pleasant, palatable, nutritious, and innocuous beverage.

The invention therefore consists in the process of manufacture of the above beverage in substantially the manner hereinafter set forth and claimed.

Since the process about to be described may be carried out in old and well-known beer-producing apparatus, as will be clearly understood by those versed in the art, said process will be set forth without reference to any particular apparatus.

In performing this invention malt and water are placed in a suitable boiler in the proportions of twenty-five kilos of malt to one hundred and fifty liters of water, the water being at a temperature of 35° centigrade. The contents of the boiler are then stirred and the temperature gradually raised during one-half hour to between 50° and 53° centigrade. By this time the whole is transformed into mash, in which state it is allowed to stand at about the temperature last mentioned for one hour. In that hour the mash may to advantage be gradually raised to 57° centigrade, at the end of which time it is to be raised to a temperature of 70° centigrade during one-half hour. The mash is then maintained at 70° centigrade for twenty-five or thirty minutes longer, during which interval saccharification takes place. The whole mass in the boiler is then transferred to a clarifier having a strainer at its outlet, through which the wort is strained or drained from the mash and put back into the boiler, where it is boiled for twenty-five minutes. It is then, while seething hot, poured over the malt husks or residue in the clarifier, in contact with which it is left for ten minutes. Then it is again drawn off and transferred to the boiler. The wort is now boiled for fifteen minutes and again while boiling hot poured over the malt husks or residue in the clarifier and allowed there to remain for ten minutes. The wort is then drawn off and once more placed in the boiler. Into the boiler with the wort are now placed nearly 0.200 kilograms of hops and the whole is boiled for about two hours until the wort becomes brightly transparent and shows fine flocks. During this stage of the process the residue in the clarifier is stirred up and leveled off. Then enough water at from 77° to 80° centigrade is added thereto to just evenly cover said residue. This mixture is allowed to stand fifteen minutes, during which the temperature may be allowed to fall as low as 63° centigrade. The infusion thus formed is drawn off and put into the boiler with the wort and the whole boiled during the remaining portion of the two hours during which the wort is to be boiled with the hops, as above stated. If the residue in the clarifier is still sufficiently rich to warrant it, it may be again stirred and flooded with water, as above described, and the infusion drawn off and added to the wort in the boiler. If this second overpouring of the residue or extraction therefrom takes place, then the wort will need to be boiled more than two hours, above specified, or until it has been concentrated to any desired density. The wort, after the above-stated concentration, is transferred to the clarifier, the latter having been previously cleansed of the residue, where the flocks settle down and the hops are strained from the wort. From the clarifier the wort is conducted, at a temperature of not less than 75° centigrade, to any suitable air-tight surface cooler, in which it is cooled off to a temperature lower than 25° centigrade. From the cooler the wort is forced through a suitable chamber, where it may be impregnated with carbonic-acid gas, and from said chamber it is passed through a filter and bottled or put into any other suitable receptacles, it having been kept from the air all the way from the clarifier to the bottles. As a further precaution the liquid in the bottles or other receptacles may be sterilized by subjecting it for an hour to a temperature of 65° to 70° centigrade, after which it may be slowly refrigerated.

The official analysis of this beverage as given by the chemist of the Canton of Basle, Switzerland, is as follows: Appearance, light brown, clear, effervescent; smell, resembles malt beer; taste, sweet, acidulous, piquant, with a slight but unmistakable taste of hop-beer; alcohol, none; glycerin, none; salicylic acid, none apparent; boric acid, none apparent; saccharin, none apparent; extract, 101.9 grams per liter; malt sugar, 65.4 grams per liter; lactic acid, 1.35 grams per liter; mineral matter, 1.80 grams per liter; phosphoric acid, 0.58 grams per liter, and albumen, 4.31 grams per liter. As the result of this analysis the chemist declares that the liquid contains ten per cent. unfermented beer-wort, that it is entirely destitute of alcohol and contains no improper ingredient, and that its nutritive value is greater than that of common fermented beer.

The above analysis and declaration is made a part of this specification.

Having thus explained wholly the nature and object of my invention, what I claim as novel, and desire to secure by Letters Patent, is—

1. The process for the production of non-alcoholic malt liquor consisting in obtaining an infusion of malt at temperatures below the boiling-point, then boiling the infusion and pouring it over the malt husks or residue several times, boiling the infusion with hops, meanwhile adding thereto an infusion taken from the residue of the mash, continuing the boiling to the desired degree of concentration, then straining the wort, cooling it out of contact with the air, impregnating it with carbonic-acid gas and filtering it under pressure and out of contact with the air, substantially as set forth.

2. The process for the production of non-alcoholic malt liquor consisting in making a mash in the proportions of twenty-five kilos of malt to one hundred and fifty liters of water at a temperature of 35° centigrade, raising the temperature of the mash to 50° centigrade during one-half hour, letting it stand at the latter temperature one hour, then raising it to 70° centigrade during one-half hour, then maintaining the mash at that temperature for twenty-five to thirty minutes, then draining off the wort and boiling it for twenty-five minutes and while seething hot pouring the same over the malt husks or residue leaving it in contact therewith ten minutes, again draining off the wort and boiling it fifteen minutes, then pouring it while hot over the malt husks or residue leaving it in contact therewith ten minutes, then drawing off the wort and boiling it for two hours with 0.200 kilograms of hops, during the boiling with the hops adding thereto an infusion obtained by flooding the malt husks or residue with water at 77° to 80° centigrade the same having been allowed to stand on said husks for fifteen minutes, then straining the hops from the wort, cooling the wort in an air-tight cooler to a temperature below 25° centigrade, impregnating the wort with carbonic-acid gas, then filtering under pressure and bottling it.

In testimony whereof I have affixed my signature in presence of two witnesses.

WILHELM RATH.

Witnesses:
GEORGE GIFFORD,
HANS KICKEWERGER.